May 3, 1955  E. ROTHMAN  2,707,572
ARTICLE TRANSFER APPARATUS
Filed Nov. 12, 1947  8 Sheets-Sheet 2

FIG.2.

INVENTOR.
EMIL ROTHMAN
BY
HIS ATTORNEYS.

May 3, 1955     E. ROTHMAN     2,707,572
ARTICLE TRANSFER APPARATUS Filed Nov. 12, 1947     8 Sheets-Sheet 1

FIG. I.

INVENTOR.
EMIL ROTHMAN
BY
Campbell, Branbaugh & Lee
HIS ATTORNEYS.

May 3, 1955

E. ROTHMAN 2,707,572

ARTICLE TRANSFER APPARATUS

Filed Nov. 12, 1947

INVENTOR.
EMIL ROTHMAN
BY
HIS ATTORNEYS.

May 3, 1955 E. ROTHMAN 2,707,572
ARTICLE TRANSFER APPARATUS
Filed Nov. 12, 1947 8 Sheets-Sheet 7

INVENTOR.
EMIL ROTHMAN
BY
HIS ATTORNEYS.

United States Patent Office 2,707,572
Patented May 3, 1955

2,707,572
ARTICLE TRANSFER APPARATUS

Emil Rothman, New York, N. Y., assignor, by mesne assignments, to Barry-Wehmiller Machinery Company, St. Louis, Mo.

Application November 12, 1947, Serial No. 785,304

3 Claims. (Cl. 214—309)

This invention relates to article transfer apparatus, and has particular reference to apparatus for unloading empty bottles or other containers from cases or cartons in which they are packed, although the invention is not limited to that use.

Empty beer, soft drink, milk and other bottles and containers are commonly returned in cases or cartons to the bottling or packing plant for reuse after cleansing and sterilization. The unloading or unpacking of the cases is performed manually and is usually done at the infeed to the bottle washing or soaking apparatus. Two or more men are usually required for unloading the conveyor-supplied cases with sufficient rapidity to provide the washer or soaker with a normal load. Because space at the washing or soaking apparatus is at a premium, it is accordingly desirable to feed the bottles thereto from a more remote point and in sufficient quantity to efficiently accommodate the capacity requirements of the apparatus.

In accordance with the present invention, an article transfer apparatus, particularly adapted for unloading or unpacking a case or carton of bottles or other uniform articles, is provided, which automatically unloads or unpacks a case in one operation and transfers the articles directly or by more remote conveying apparatus, to the infeed of succeeding processing apparatus, such as a bottle washing or soaking apparatus, the articles being supplied as a continuous stream accommodated to the capacity requirements of the apparatus.

In a preferred embodiment of the invention, the loaded cases of empty bottles or other uniformly-arranged articles are supplied by a driven or gravity conveyor to an unloading platform on which the case is centered in one vertical plane by a gauge stop and in the coordinate vertical plane by an intermittent aligner which moves the case a predetermined distance to accurately center it in the last-named vertical plane. Positioned over the case so centered on the loading platform, and adapted to reciprocate vertically on the axis represented by the intersection of the aforementioned coordinate centering vertical planes, is the unloading head of the machine. The unloading head is provided with bottle chucks equal in number and spacing to the bottles in the case and each provided with spring jaws which encircle the corresponding bottle as the head descends. The jaws are then actuated to grip the bottles, whereupon the head rises to lift the bottles from the case, which is discharged from the machine by a case outfeed conveyor to be replaced by a filled case in the manner described.

A stripper table is moved horizontally to a position immediately beneath and spaced a fraction of an inch below the bottoms of the suspended bottles, which are then released by the bottle-gripping chucks of the unloading head so as to drop said small fraction of an inch onto the stripper table. The stripper table advances horizontally to carry the bottles over a horizontal conveyor and a stripper bar drops behind the last row of bottles on the stripper table, which is then retracted while the bottles are stripped therefrom onto the conveyor by means of the stripper bar which accordingly keeps the bottles from being retracted with the stripper table. Upon retraction to the position beneath the unloading head, the stripper table is ready for a new load, the head having descended and unpacked the next case in the meantime. Also, after having stripped the bottles from the stripper table, the stripper bar is raised clear of the table to permit the loaded table to advance on its next trip. The bottle conveyor, upon receiving the bottles from the stripper table, transfers them to an outfeed conveyor serving the bottle washing or soaking apparatus or other processing equipment. Safety means are provided to stop the machine in the event of misalignment of a case on the loading platform, and the like.

It will be seen that the article transfer apparatus of this invention provides automatic unloading or unpacking of cases filled with bottles or other uniformly arranged articles and the like, with facility and dispatch, and its speed may be gaited to the succeeding processing apparatus to serve the same efficiently and economically, without the manual attention and labor heretofore needed, requiring merely the services of an attendant to inspect and maintain the efficient operation of one or more unloading or unpacking lines from the case receiving to the processing apparatus.

For a more complete understanding of the invention, reference may be had to the accompanying drawings, in which.

Figure 1:
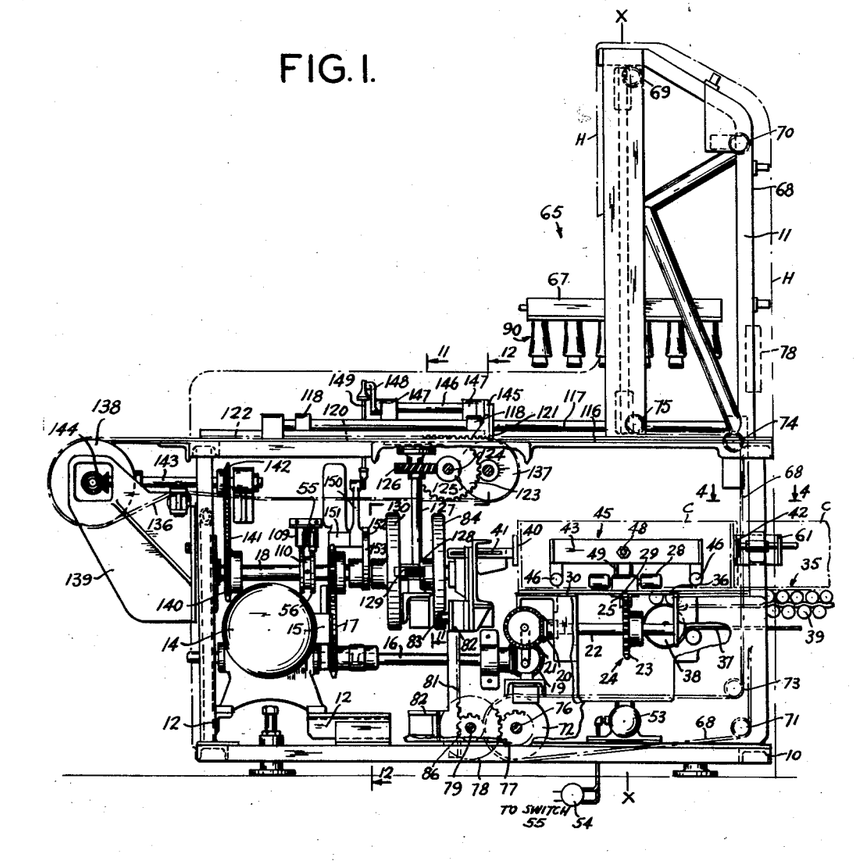
Figure 1 is a side elevation of the article transfer apparatus of this invention, the housing being shown in phantom in order to expose to view the various operating mechanisms.
Figure 2:
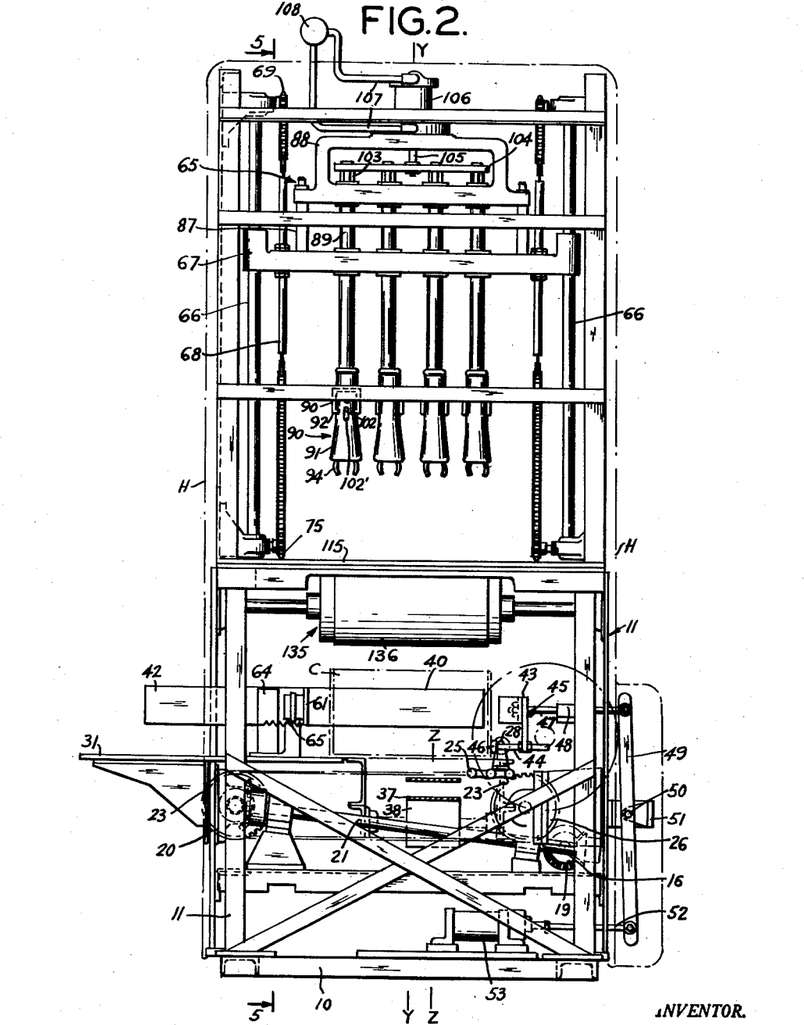
Fig. 2 is an elevation of the case infeed end of the machine as seen from the right of Fig. 1.

Referring to Figs. 1 and 2 of the drawings, numeral 10 designates a base mounting a supporting frame 11 on both of which the component parts of the operating mechanism of the apparatus of this invention are variously mounted. The sheet metal housing H is indicated in phantom.

Adjustably secured to suitable brackets 12 on the base 10 is the power drive for the machine comprising a motor 13 connected to a conventional variable speed mechanism 14 whose speed ratio relatively to the motor speed is adjustable at will as is well known. The output shaft 16 of the variable speed mechanism 15 drives, through chain 17, a main power shaft 18 whose free end is suitably journalled on frame 11, as is shown especially in Fig. 1. The majority of the cams, gears and sprockets constituting the driving mechanism for the various elements of the apparatus are mounted on main power shaft 18.

Also driven from the output shaft 16 of the variable speed mechanism 15 through bevel gearing 19 and 20 and shafts 21 and 22 is the power sprocket 23 of the case discharge conveyor 24, best shown in Figs. 1 and 2, consisting of a chain 25 passing over sprocket 23 and idler sprocket 26 and carrying the case-engaging cross-bar 28 extending through a slot 29 in a stationary horizontal supporting plate 30 on which the incoming cases to be unloaded come to rest. The chain 25 having such case-engaging cross-bar 28 is so timed as to make one complete revolution for each unloading cycle, so that the bar 28 only engages a case and moves it along plate 30 after the case has been unloaded, to discharge the empty case onto the discharge shelf 31 aligned with plate 30. The empty case is then cleaned, and repaired if necessary, for repacking with filled bottles.

As shown particularly in Figs. 1 and 2, the incoming cases may be gravity-fed but are preferably supplied by an infeed conveying system 35 of conventional construction comprising rollers 36 tangent to the upper surface of case-receiving plate 30 and extending near the center of the same, as shown in Fig. 1. Rollers 36 are frictionally rotated by a belt 37 passing over rollers 39 and drum 38 driven from shaft 16, or some other power source, not shown. The incoming cases C are discharged by infeed conveyor 35 onto the stationary receiving plate 30 against a gauge bar 40 supported by a suitable position-adjusting mechanism 41 so as to be advanced or retracted relatively to opposite spacing bar 42 in order to accommodate cases of different sizes.

Figure 3:
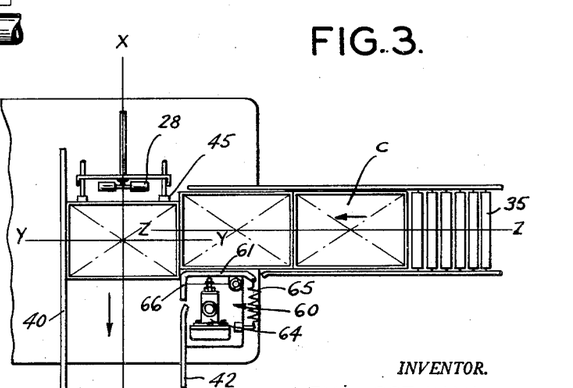
Fig. 3 is a schematic plan diagram of the case infeed, centering and discharge sequence.

Although the loaded case entering the machine as described is centered laterally, i. e., transversely of the infeed conveyor 35 along vertical center line X—X shown in Figs. 2 and 3 by gauge bar 40 and cooperating guide bar 42, the case enters the machine off center from the longitudinal center line Y—Y, which is a predetermined distance, say one and three-fourths inches, from the center line Z—Z of the infeed conveyor 35, as indicated in Figs. 2 and 3. This offset is intentional for it affords the leeway necessary to accurate centering on axis Y—Y in order that the bottle-gripping chucks of the bottle unloading head may be accurately aligned with the bottles in the case to be unloaded. This centering of the case on axis Y—Y is effected by a case aligner 45, actuated in timed relation with the bottle infeeding and unloading operations, to push the case from incoming center line Z—Z onto unloading position center line Y—Y, or the assumed distance of one and three-fourths inches.

Case aligner 45 comprises a cross bar 43 adjustably supporting a pair of rods 44 having case-engaging pads 46. Cross-bar 43 is in turn mounted on a horizontal rod 47 slidable axially in a thimble 48 fixed to the frame 11. The free end of rod 47 is connected to the upper end of a lever 49 pivoted at its center 50 on a bracket 51 secured to the frame 11 and actuated by the piston rod 52 of an air cylinder 53 mounted on the base 10. The solenoid controlled air valve 54 of air cylinder 53 is actuated in proper timed relation by a switch 55 actuated by cam 56 on main shaft 18. As stated, and indicated diagrammatically in Fig. 3, case aligner 45 accurately centers the case on axis Y—Y and is then retracted by the action of cam 56 for the next operation, so that the case is accurately centered on both coordinate axes X—X and Y—Y, whose intersecting vertical planes also constitute the vertical center line of reciprocation of the unloading head to be described.

Figure 4:
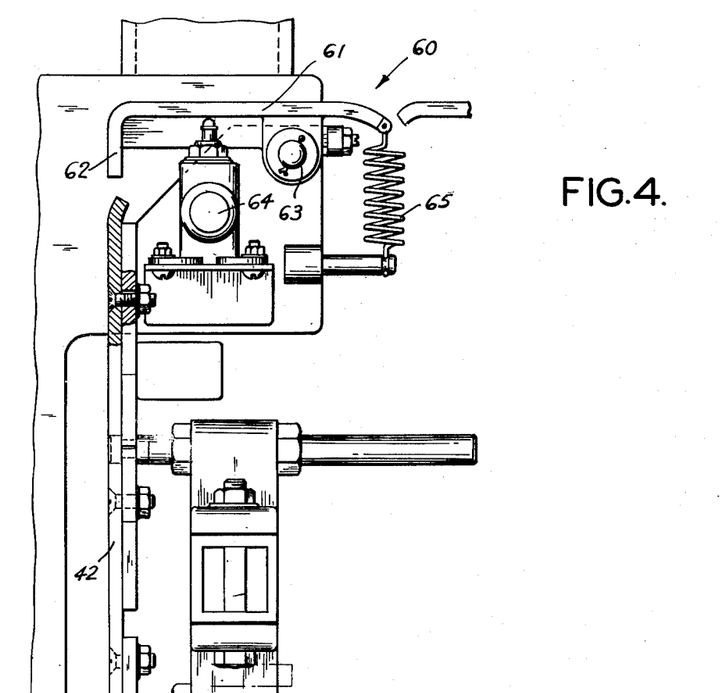
Fig. 4 is an enlarged plan view of the safety mechanism responsive to a misaligned incoming case, as seen along the line 4—4 of Fig. 1.

A safety device responsive to misalignment of an incoming full bottle case is provided to preclude a synchronism between the case infeed and the operation of the machine. This safety mechanism is designated 60 and is best shown in the enlarged plan view of Fig. 4 and includes an L-shaped detent 61 having its short leg 62 normally aligned with case guide bar 42 and pivoted at 63 on the machine. A switch 64 in the power circuit of the driving motor 13 is held normally-closed by spring 65 connected to detent 61 but is adapted to be opened to stop the motor 13 when the detent 61 is swung counterclockwise about its pivot 63 against the tenstion of spring 65. This safety mechanism 60 normally does not come into operation except when a case on infeed conveyor 35 lags and hence does not reach the far gauge bar 40 before aligner 45 comes into operation. The misaligned leading case is accordingly not pushed between bars 40 and 42, not having cleared the edge of the latter, so that it fouls detent 61 and trips the same when the case is pushed against it by aligner 45, thus causing the switch 64 to be actuated to open the motor circuit, which remains open until the case is manually replaced to the proper position, enabling spring 65 to reclose switch 64 and restore the circuit of motor 13. A case may lag when the supply of following cases is interrupted so as to prevent the leading case from being pushed by the following cases all the way onto plate 30 and up against stop 40, which accordingly serves as a gauge, not only for positioning the case on axis X—X but also for precluding operation of the safety mechanism 60.

Figure 5:
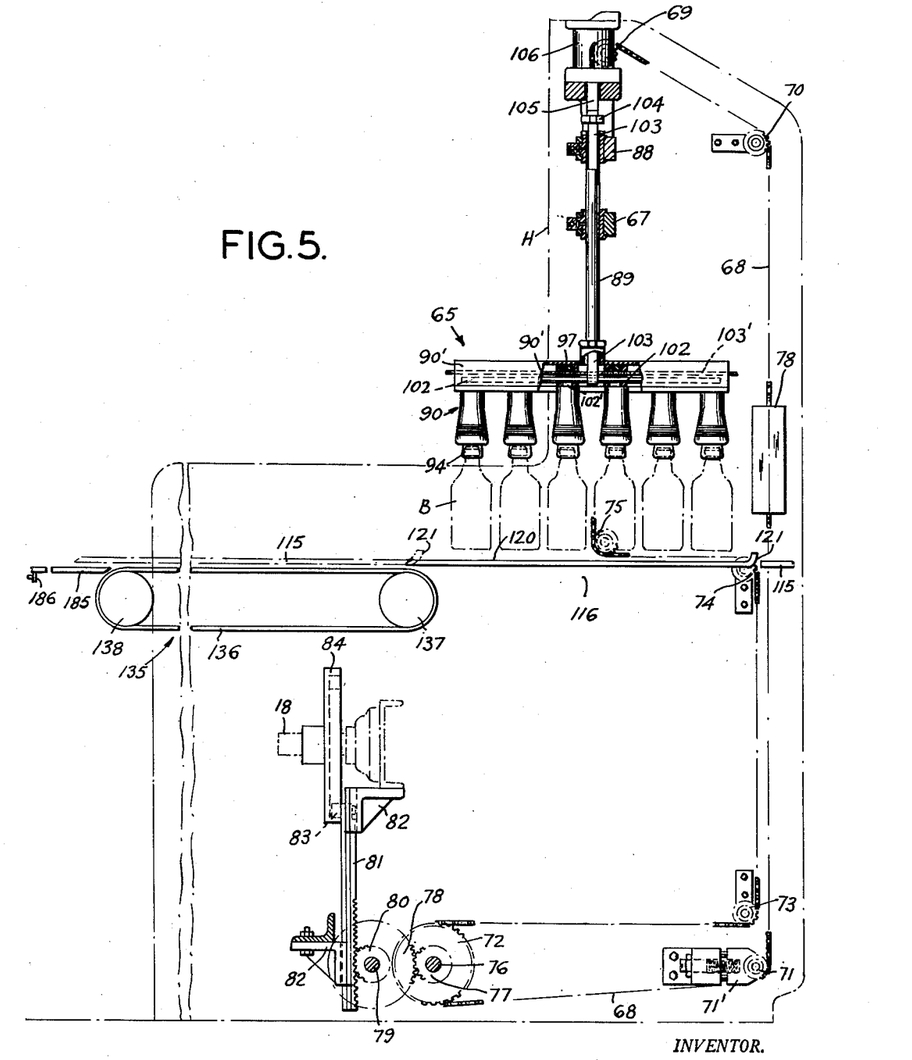
Fig. 5 is a vertical section through the machine as seen along the line 5—5 of Fig. 2, and illustrates the construction and operating mechanism of the case unloading or unpacking head.

The case unloading head is generally designated 65 and is best shown in Figs. 1, 2 and 5. It is adapted to reciprocate vertically on the axis represented by the intersection of vertical planes X—X and Y—Y on which the center of the case to be unloaded is positioned on plate 30 as described. To this end the main frame 67 of the unloading head 65 is slidably mounted on vertical rods 66 secured in the frame 11 at either side of the machine and is also supported at either side by a pair of chains 68, or alternatively, steel tapes, passing generally vertically over a series of sprockets or pulleys. Thus, assuming that chains are used, each chain 68 is secured to frame 67 and passes over an upper sprocket 69, journalled on the frame 11, rearwardly over an idler sprocket 70, vertically downwardly over a lower sprocket 71, having slack take-up mechanism 71', horizontally and forwardly over a large drive sprocket 72, then horizontally rearwardly over a second lower sprocket 73, upwardly to a rear middle sprocket 74, again forwardly over a front middle sprocket 75, and then upwardly back to the frame 67, as shown especially in Figs. 1 and 5. It will be understood that all of the sprockets mentioned are suitably journalled on the frame 11, as shown. A counter-weight 78 is preferably mounted on one or both chains 68 to counterbalance the weight of the unloading head 65.

The drive sprockets 72 for the two chains 68 are mounted on a cross-shaft 76 journalled on the frame 11 and carrying a pinion 77 which is driven by a large spur gear 78 mounted on a jack shaft 79. A drive pinion 80 for shaft 79 meshes with and is driven by a vertical rack 81 suitably mounted for vertical reciprocation in brackets 82 on the frame 11. The upper end of the rack 81 carries a cam-following roller 83 engaging in the groove in a cam 84 mounted on main drive shaft 18. The groove of cam 84 is so shaped as to impart to the head 65 a vertical reciprocating movement timed with the positioning of the case to be unloaded at the unloading position on axes X—X and Y—Y by the combined actions of infeed conveyor 35 and gauge plate 40 for axis X—X and aligner 45 for axis Y—Y. The stroke of the head is such as to cause its bottle chucks to be lowered over the necks of the bottles in the lower position and to cause the bottles to be suspended in the upper position over the stripper table to be described.

Figures 6, 7:
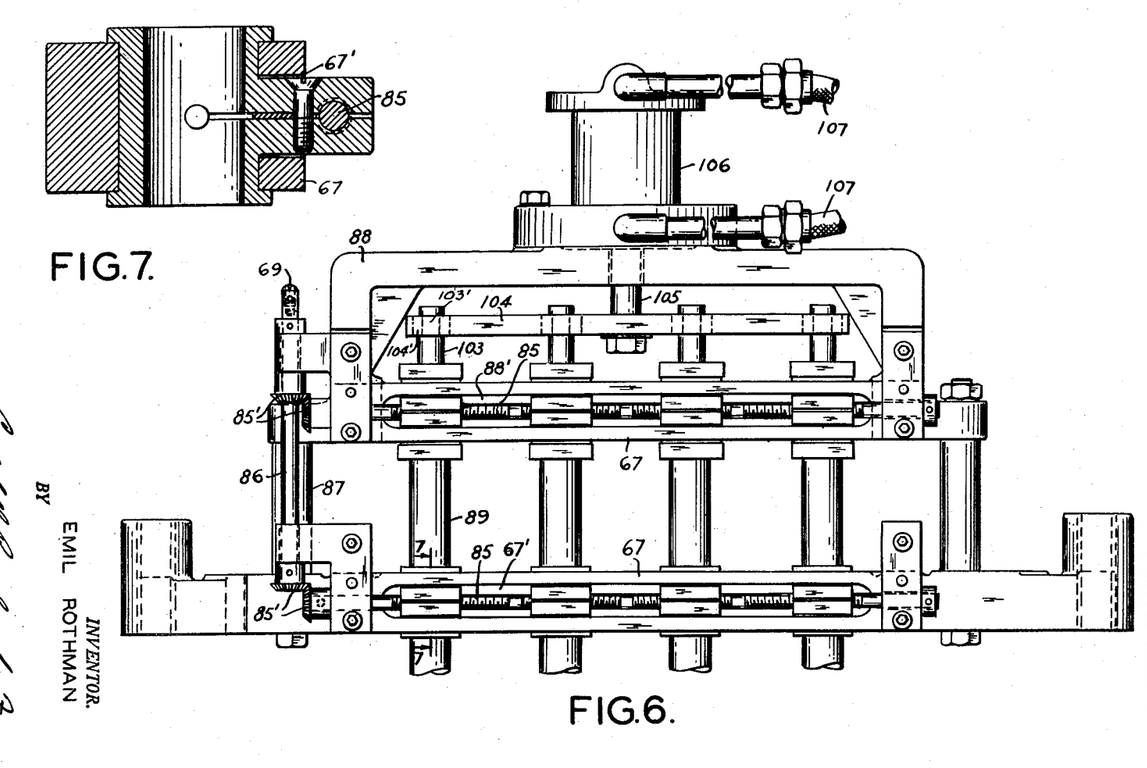
Fig. 6 is an enlarged elevation of the upper portion of the unloading or unpacking head.
Fig. 7 is a transverse section as seen along the line 7—7 of Fig. 6 through a portion of the unloading or unpacking head to illustrate a detail of means for adjusting the spacing between adjacent rows of bottle chucks to compensate for variations in case dimensions.

As is shown particularly by Figs. 2, 5 and 6, supported by bolt and spacer combinations 87 on the main frame 67 of unloading head 65 is a secondary frame 88 on which are mounted a series of equally-spaced tubes 89 passing downwardly through main frame 67 and spaced apart and equal in number respectively to the spacing and the number of the rows of bottles in the case to be unloaded. Preferably the spacing between the tubes 89 is adjustable to compensate for difference in spacing between the rows of bottles of one type of case, due for example to the difference in thickness between the bottle-separating honeycombs. To this end the bars of frame 67 are slotted longitudinally as indicated at 67' and 88' in Figs. 6 and 7, and horizontal shafts 85 threaded through them. Shafts 85 are connected by bevel gearing 85' to a vertical shaft 86 journalled in frame 67, 88 and rotatable by a crank or wrench to adjust the spacing between tubes 89 and the corresponding rows of bottle chucks. It will be understood that shafts 85 are of opposite pitch on opposite sides of the center, and their thread pitch increases outwardly from the center.

Figure 8:
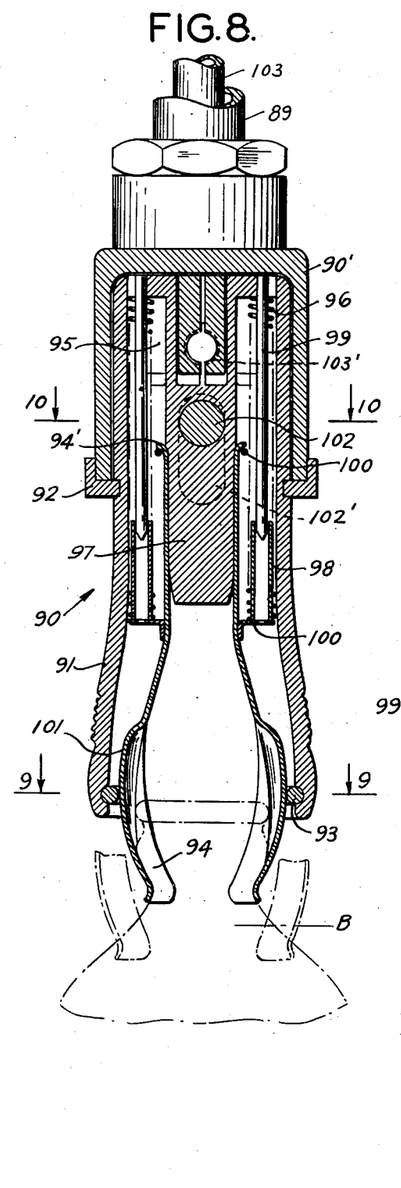
Figs. 8, 9 and 10 are, respectively, an axial section, and two cross-sections through the bottle chuck as seen along the lines 9—9 and 10—10, respectively, of Fig. 8.
Figure 9:
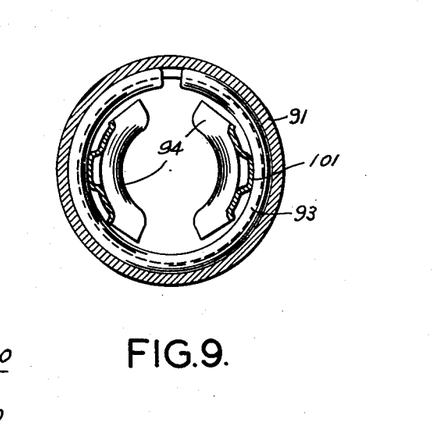
Figure 10:
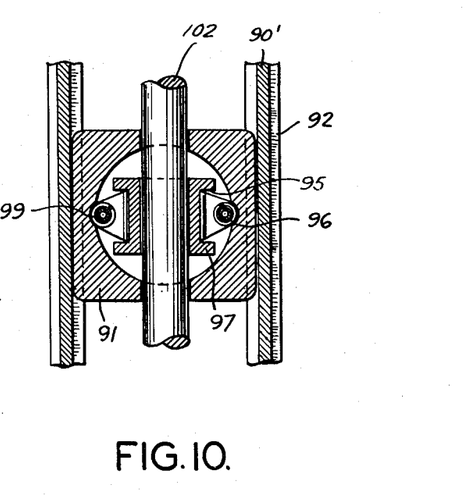

Supported on the lower end of each tube 89 is a corresponding channel-shaped yoke 90' carrying a corresponding row of bottle-gripping chucks 90, the detailed construction of which is best shown by Figs. 8, 9 and 10.

The open lower side of each transverse yoke 90' receives the upper ends of the bells 91 of the corresponding chucks 90 which are provided with opposite slots in which the inturned lugs of clips 92 on the yoke 90 are removably inserted. As shown in Figs. 8 and 9, the bell 91 is provided at its mouth with an interior ring 93 engaging a pair of bottle neck gripping jaws 94 individually slidable in grooves 95 in opposite surfaces of an inner frame 97 mounted for reciprocating movement within the bell 91. As best shown in Fig. 10, the grooves 95 in inner frame 97 also accommodate a pair of light coil springs 96 which are centered at their upper ends by pins 99 telescoped in tubes 98 carried by the corresponding gripper jaws 94. Springs 96 accordingly normally and independently urge each jaw 94 downwardly so that the outwardly-turned upper ends 94' of the jaws rest against stop pins 100. Normally springs 96 perform no function, but move up and down with the inner frame 97 and the gripping jaws 94. However, upward pressure on the lower end of either gripping jaw 94 causes the corresponding spring 96 to compress and the jaw to move upwardly or retract when it engages an obstruction, such as a misaligned or inverted bottle, so that the chuck 90 is not injured and the remaining chucks may perform their bottle-gripping function notwithstanding such interference with one chuck.

It will be observed that the portions of the gripping jaws 94 that pass through the ring 93 are provided with cam-shaped projections 101, which engage the ring 93. The jaws 94 are made of spring steel and their normal resiliency urges them outwardly within the limits afforded by ring 93 so that when they are in their lowermost positions shown by dotted lines in Fig. 8, they are spread widely to admit the neck of the bottle B between them and when frame 97 is raised, the cam action between the cam surfaces 101 of the opposite gripping jaws 94 and the ring 93 causes the jaws to be contracted upon the neck of the bottle to grip the same, as shown by the solid lines in Fig. 8.

Each of the inner frames 97 of the bottle-gripping chucks 90 of each row, on each of the yokes 90', i. e., six chucks per yoke in the example shown, is slidably supported on cross-rod 102 passing through vertical slots 102' and connected to the lower end of a rod 103 passing upwardly through the corresponding tube 89 and having a reduced portion 103' at its upper end to permit it to slide laterally in an elongated slot 104' in the cross-head 104 as shown particularly in Figs. 2, 5, 6 and 8. Preferably, the spacing between the chucks 90 is made adjustable to compensate for variations in bottle spacing, this adjustment being made in the same manner and by similar means as is employed to adjust the tubes 89, shown in Figs. 6 and 7. Thus, frames 97 of the chucks are so mounted on a threaded bolt 103' that the three chucks on either side of the center will simultaneously move outwardly or inwardly on the corresponding yokes 90', as the case may be, and the pitch of the thread on bolt 103' increases outwardly from the center so that the adjustment between chucks is uniform. Clips 92 then serve as keys.

Cross-head 104 is supported by the lower end of the piston rod 105 of an air cylinder 106 carried by the secondary frame 88 and supplied with air lines 107 leading to opposite sides of the piston within the air chamber 106. Air lines 107 are connected to a valve 108 interposed between the cylinder 106 and an air reservoir, not shown. Valve 108 is preferably a solenoid or other electrically-operated valve controlled by a switch 109 operated by cam 110, mounted on the main drive shaft 18, as indicated in Fig. 1.

It will be understood that cam 110 effects operation of the air cylinder 106 so that its piston raises cross-head 104, rods 103 and chuck frames 97 to draw jaws 94 upwardly within corresponding rings 93 and thus actuate gripper chucks 90 to grip and hold the bottle necks introduced within them. After the bottles are raised from the case to the proper elevation, the cam 110 again causes lowering of the air piston, cross-head 104, rods 103, and chuck frames 97 to cause the jaws 94 to release bottles in timed relation with the movements of the case unloading head 65 and the other correlated mechanisms of the apparatus. Thus, head 65 is lowered by cam 84 to drop open chucks 90 over each of the bottles in the cases aligned on axes X—X and Y—Y beneath it on the plate 30, whereupon air cylinder 106 is operated by cam 110 to raise cross-head 104 to retract bottle-gripping jaws 94 within ring 93 and then close them on the necks of the corresponding bottles to grip them. Then the cam 84 elevates the head 65 and the gripped bottles are accordingly withdrawn from the case in a vertical direction to the elevated position shown in Figs. 5 and 13.

Figures 11, 12:
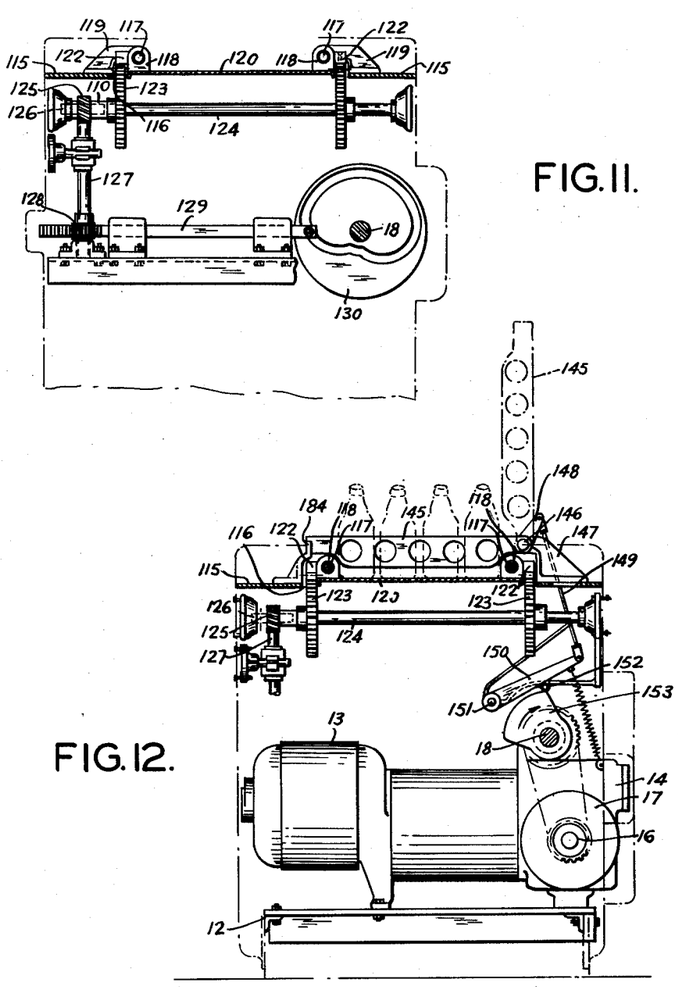
Fig. 11 is a vertical section as seen along the line 11—11 of Fig. 1 and illustrates the stripper table construction and operating mechanism.
Fig. 12 is a vertical section as seen along the line 12—12 of Fig. 1 and illustrates the stripping bar construction and operating mechanism; and, Fig. 13 is a schematic diagram illustrative of the operation of the stripping mechanism.
Figure 13:
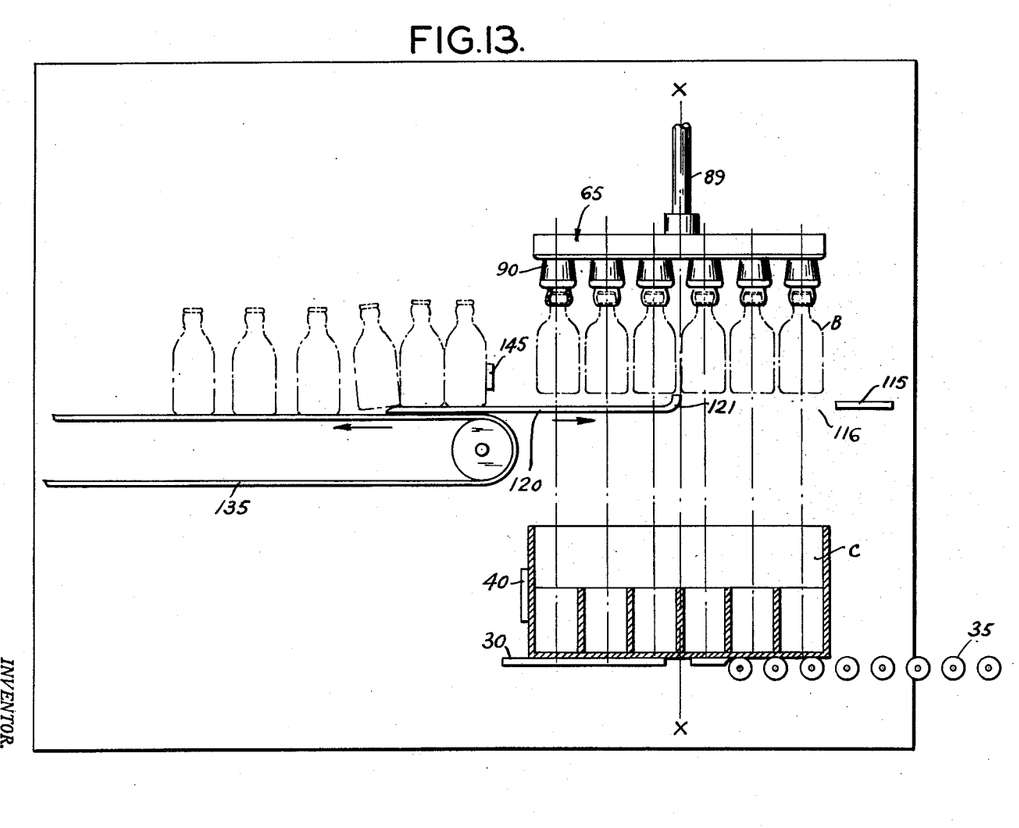

As shown particularly in Figs. 1, 11 and 13, the horizontal table-height upper surface 115 of the machine is provided with an opening 116 through which the bottles are elevated by the head 65 in the manner previously described. Mounted on brackets 119 on the frame 11 at each side of the opening 116 is a horizontal bar 117 on which slide the yokes 118 carrying the horizontal stripper table 120, best shown in Figs. 1 and 11. Stripper table 120 is a flat metal plate adapted to be retracted rearwardly in a horizontal plane along bars 117 to a position over opening 116 and immediately beneath the bottles held in elevated position by the gripping head 65, a fraction of an inch above the stripper table 120 when it is retracted, as indicated in Figs. 5 and 13. As shown in Figs. 1, 5 and 13, the rear edge of the stripper table 120 is provided with a low ledge 121 of such height as to clear the bottoms of the suspended bottles when the table is retracted beneath them, but sufficiently high to engage the side walls of the last transverse row of bottles when they rest on the table 120, for a purpose to be described.

As shown particularly in Figs. 1, 11 and 12, the yokes 118 supporting stripper table 120 are fitted at their lower edges with horizontal racks 122 meshing with corresponding pinions 123 mounted on horizontal cross-shaft 124 suitably journalled on the frame 11. A worm 125 is mounted on shaft 124 and meshes with a worm wheel 126 carried by a vertical shaft 127 suitably journalled on the frame 11 and carrying at its lower end a pinion 128 driven by a rack 129 actuated by a cam 130 mounted on main drive shaft 18. The movable rack, pinion and worm drive mechanism just described affords the requisite long throw of the stripper table 120 from a first position beneath the full complement of bottles carried by the unloading head 65 to the advanced position best shown in Fig. 1, where the stripper table 120 is located above horizontal bottle discharge conveyor 135.

Referring to Figs. 1 and 2, the bottle discharge conveyor 135 comprises a belt 136 passing over a rear pulley or roller 137 journalled on frame 11 and over a front pulley or roller 138 journalled on bracket 139 mounted on frame 11. The front pulley 138 of conveyor 135 is continually driven from the drive shaft 18 by means of a sprocket 140 connected by chain 141 to sprocket 142 on shaft 143 which is connected by bevel gearing 144 to the shaft 145 of the front pulley 138. It will be observed from Figs. 1, 2 and 13 that the rear end of conveyor 135 is positioned adjacent the trap or opening 116 over which the stripper table 120 is moved to a position beneath the suspended bottles in order to receive the same. Thus, the stripper table 120 moves back and forth from a retracted position beneath the suspended bottles over the opening 116 to an advanced position over the bottle receiving conveyor 135 for stripping of the bottles therefrom and then repeats the cycle.

In order to strip the bottles from the stripper table 120 onto the bottle receiving and discharge conveyor 135, the bottles must be kept from being returned with the stripper table 120 when it is retracted beneath the elevated head 65 to receive a new load of bottles. This bottle holding function is performed by a stripper bar 145 best shown in Figs. 1, 12 and 13 and mounted on a horizontal shaft 146 journalled in brackets 147 mounted alongside the stripper table 120. Mounted on the free end of shaft 146 is a crank 148 whose free end is connected by link 149 to a lever 150 pivoted at 151 on the frame 11 and carrying a cam-following roller 152 engaging cam 153 mounted on main drive shaft 18. Cam 153 is so shaped as to cause stripper bar 145 to be raised from the horizontal or stripping position to the dotted line position shown in Fig. 12, so that a filled stripper table 120 may be moved forwardly without interference by the bar 145. Thereafter, cam 153 lowers bar 145 to the horizontal position shown, with the free end thereof resting on the bracket 184, so that the bar 145 lies behind the last row of bottles on the stripper table, as best shown in Fig. 13. Consequently, as the stripper table 120 is retracted by its cam 130, the stripper bar 145 prevents the bottle from retracting with the table 120, and consequently strips them onto discharge conveyor 135, from which they are in turn discharged onto table 185. The crowding action of the following bottles may be utilized to push the leading bottles over tables 1 and 5 and onto a conveyor 186, indicated in Fig. 13, leading to bottle washing or soaking or other processing apparatus, or they may be otherwise handled manually or automatically.

Although operation of the article transfer apparatus of this invention will be readily understood from the foregoing description, a brief summary of a typical sequence of operations involving the course of a single case and its contents through the machine may aid in an understanding of the integration of the component parts of the apparatus, and may be followed by reference to Figs. 1, 2, 3, and 13, particularly.

Before placing the machine in operation, the bottle chucks 90 of the unloading or unpacking head are adjusted by means of mechanism 85, 85', and 86 illustrated by Figs. 6 and 7 to conform the spacing between chuck-holding yokes 90' to the spacing between the corresponding rows of bottles in the particular case to be unpacked, and the chucks on yokes 90' are also adjustable by similar mechanism along the corresponding yokes between coordinate rows of bottles. When the chucks 90 have been aligned with the bottles in the cases to be described, the machine is ready for operation, the cases to be unpacked being supplied thereto in sequence on case infeed conveyor 35.

Considering the leading case C filled with empty bottles, it enters the machine on horizontal infeed conveyor 35 in the direction of its longitudinal center line which lies in vertical plane Z—Z, as shown in Fig. 3, and is deposited on horizontal platform 30 and urged therealong by the conveyor and by following cases against gauge plate 40, which accurately centers the case so that its transverse center line lies in vertical plane X—X, as indicated diagrammatically in Fig. 3. Immediately upon engagement of the case with gauge plate 40, still with its longitudinal center line lying in vertical plane Z—Z, cam 56 effects actuation of case aligner mechanism 45, which moves the case C laterally so that its longitudinal center line is displaced out of vertical plane Z—Z and accurately positions the case so that its longitudinal center line lies in vertical plane Y—Y. The geometric center of a vertical projection of the case thus coincides with the intersection of vertical planes X—X and Y—Y, which is also the line of vertical reciprocation of the unloading or unpacking head, as indicated clearly in the diagram of Fig. 13, in which the edge of the X—X plane is shown as representative of the intersection of that plane with the Y—Y plane. If a case is not in contact with gauge 40, i. e., its transverse center line does not lie in the X—X plane, before case aligner 45 engages and pushes the case toward the Y—Y plane, the misaligned case fouls and trips safety mechanism 60 and shuts off the main drive motor 13, until the case is realigned.

After the case C has been centered on the plate of platform 30 as described, cam 84 causes unloading or unpacking head 65 to descend with its chucks open through trap 116 to a lower position such that the upper ends or necks of the bottles B in the case enter the corresponding open chucks 90 in the relationship indicated by dotted lines in Fig. 8. While the chucks 90 are in this position relatively to the corresponding bottles B, cam 110 causes actuation of air cylinder 106 to raise cross-head 104, attached to vertical rods 103, carrying the cross rods 102, shown in Figs. 5 and 6, so as to upwardly retract chuck jaws 94 within their corresponding rings 93 to close the jaws 94 upon the necks of the bottles and grip the same, as shown by solid lines in Fig. 8. If one or more of the bottles in the case are misaligned or inverted, so as to preclude entry of the bottle part between the open chuck jaws 94 when the head 65 is lowered as described, safety springs 96 of the chuck allows either or both jaws to retract when it or they engage the fouling bottle, so that the chuck is not injured. Because of the individual action of the chucks in response to an obstruction, the remaining chucks are not interfered with and perform their intended bottle-gripping function.

Immediately upon operation of the chucks 90 to grip the bottles as described, cam 84 again comes into operation to raise the head 65 and lift the entire load of bottles from the case to a position such that the bottoms of the suspended bottles are spaced a fraction of an inch above the surface of the table top 120 and so as to clear the ledge 121 on the rear edge of the stripping table 120, as illustrated in Figs. 5 and 13. As soon as the bottles are clear of the case C, bar 28 on case infeed conveyor 24 engages the empty case and discharges it from the machine onto shelf 31 for refilling after cleaning and such repair as may be necessary.

When the load of suspended bottles B has been raised to the upper position shown in Fig. 13, cam 130 effects actuation of pinions 123 and racks 122 to move stripper table 120 under the suspended bottles to the position covering trap 116 as shown in Fig. 5. Upon reaching this retracted position, stripper table 120 receives the entire load of bottles from head 65 through the action of cam 110, which causes air cylinder 106 to drop cross-head 104, rods 103, cross-rods 102, and chuck jaws 94 to permit the latter to spring open as indicated by the dotted lines in Fig. 8, so that the bottles are released and drop the said fraction of an inch onto the stripper table 120.

Carrying its load of bottles, stripper table 120 is then advanced to the left, as seen in Fig. 13, by action of its cam 130, ledge 121 meanwhile preventing the bottles from sliding off of the rapidly moving stripper table 120, which is caused by cam 120 to come to rest over the bottle outfeed conveyor 135, this position being clearly shown by dotted lines in Fig. 5 . Thereupon cam 153 drops stripper bar 145 behind the last row of bottles on the advanced stripper table 120, as indicated in Fig. 13, so that when cam 130 again retracts stripper table 120 to a position over trap 116, stripper bar 145 strips the bottles from stripper table 120 onto conveyor 135, this action being illustrated by Fig. 13. After stripping the bottles from table 120, cam 153 raises stripper bar 145 to the position shown by dotted lines in Fig. 12, so that the stripper table 120 may carry the next load of bottles over conveyor 135 without interference from bar 145.

The cycle just described is then repeated, viz., another filled case is deposited on platform 30 by infeed conveyor 35, centered on axes X—X and Y—Y by gauge 40 and aligner 45, respectively, and then unloaded or unpacked by the unloading head 65, which then rises with its load of bottles through open trap 116 to the upper position. Case outfeed conveyor bar 28 moves the empty case out of the machine onto discharge table 31 and the stripper table 120 is moved under the suspended bottles which are dropped thereon by head 65 for transfer by the stripper table to the left of Fig. 13 to a position over the outfeed conveyor. At this point stripper bar 145 drops behind the last row of bottles on table 120, so that when the latter is retracted to the right in Fig. 13 the bar 145 strips the bottles from table 120 onto the conveyor 135 for outfeed to a discharge conveyor 186 or the like. Then the stripper bar 145 is raised and the cycle is repeated for the next case.

Although a preferred embodiment of the invention has been illustrated and described herein, it is to be understood that the invention is not limited thereby, but is susceptible to changes in form and detail within the scope of the appended claims, wherein the term "case" means a bottle or other article-containing case, crate, carton, tray, pallet or other carrier for regularly-arranged articles.

I claim:

1. In apparatus for transferring regularly-arranged articles from a case, the combination of a frame, a table mounted on said frame for movement from one position to another position thereon, means having gripping members corresponding to and arranged in accordance with said articles in said case for transferring said articles from said case to said table in said one position of the latter, a receiving support adjacent said table at the other position thereof, means for driving said table from said one position to said other position and return, a stripping member adapted to be moved into alignment with and behind the articles on said table in said other position, and mechanism actuated in accordance with the movements of said table driving means for moving said stripping member behind said articles on said table after movement thereof to said other position, whereby said articles are stripped from said table onto said receiving support upon return of said table by said table driving means from said other position to said one position.

2. In apparatus for transferring regularly-arranged articles from a case, the combination of a frame, a table mounted on said frame for movement from one position to another position thereon, means having regularly arranged article gripping members thereon corresponding in number and arrangement to the articles in said case, mechanism for lowering said last-named means above said table for transferring said articles from said case to said table in said one position of the latter, a receiving support adjacent said table at the other position thereof, means for driving said table from said one position to said other position and return, a stripping member adapted to be moved into alignment with and behind the articles on said table in said other position, and mechanism actuated in accordance with the movements of said table driving means for moving said stripping member behind said articles on said table after movement thereof to said other position, whereby said articles are stripped from said table onto said receiving support upon return of said table by said table driving means from said other position to said one position.

3. In apparatus for transferring regularly-arranged articles from a case, the combination of a head having a plurality of article-transfer members regularly arranged thereon in conformance with the regular arrangement of said article in said case, a normally inactive article-holding means on each of said members, means for positioning a case beneath and in vertical alignment with said head, mechanism for lowering said head to engage said members with the corresponding articles on said case, means for actuating said holding means of each member to grip the corresponding article, means for raising said head to simultaneously lift the articles from said case, a table, mechanism for advancing said table to a horizontal position beneath said articles suspended from said head, means for actuating said holding means to release said articles onto said table, means for retracting said table to remove said articles from beneath said head, a movable stripping bar positioned adjacent the retracting path of said table, and means actuated in accordance with the movement of said retracting means for moving said stripping bar behind the last article on said retracted table, whereby advancing movement of said table by said mechanism causes said bar to prevent movement of said articles with said table and consequent stripping of said articles therefrom.

References Cited in the file of this patent

UNITED STATES PATENTS

| Number | Name | Date |
|---|---|---|
| 1,358,255 | Seufer et al. | Nov. 9, 1920 |
| 1,613,330 | Prescott | Jan. 4, 1927 |
| 1,639,576 | Semashko | Aug. 16, 1927 |
| 1,842,912 | McNamara | Jan. 26, 1932 |
| 1,904,720 | Douglass | Apr. 18, 1933 |
| 1,965,745 | Luce et al. | July 10, 1934 |
| 2,119,725 | Stecher | June 7, 1938 |
| 2,229,502 | Herbert | Jan. 21, 1941 |
| 2,236,761 | Nichols | Apr. 1, 1941 |
| 2,253,283 | Minaker | Aug. 19, 1941 |
| 2,283,614 | Schmidt | May 19, 1942 |
| 2,313,478 | Neja | Mar. 9, 1943 |
| 2,328,388 | Morgan et al. | Aug. 31, 1943 |
| 2,332,058 | Cattonar et al. | Oct. 19, 1943 |
| 2,371,128 | Costa | Mar. 13, 1945 |
| 2,376,457 | Skoog | May 22, 1945 |
| 2,431,320 | Fischer | Nov. 25, 1947 |
| 2,442,827 | Schmidt | June 8, 1948 |
| 2,561,529 | Mongan, Jr., et al. | July 24, 1951 |